United States Patent
Yan et al.

(10) Patent No.: US 11,403,520 B2
(45) Date of Patent: Aug. 2, 2022

(54) NEURAL NETWORK MACHINE TRANSLATION METHOD AND APPARATUS

(71) Applicant: BAIDU ONLINE NETWORK TECHNOLOGY (BEIJING) CO., LTD., Beijing (CN)

(72) Inventors: Chunwei Yan, Beijing (CN); Zhijie Chen, Beijing (CN); Hanju Guan, Beijing (CN); Ying Cao, Beijing (CN); Kefeng Zhang, Beijing (CN); Wei Huang, Beijing (CN); Muchenxuan Tong, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 1226 days.

(21) Appl. No.: 15/881,601

(22) Filed: Jan. 26, 2018

(65) Prior Publication Data

US 2018/0225572 A1    Aug. 9, 2018

(30) Foreign Application Priority Data

Feb. 3, 2017   (CN) .......................... 201710063687.7

(51) Int. Cl.
*G06N 3/08* (2006.01)
*G06N 7/00* (2006.01)
*G06N 3/04* (2006.01)
*G06F 40/45* (2020.01)

(52) U.S. Cl.
CPC .............. *G06N 3/08* (2013.01); *G06F 40/45* (2020.01); *G06N 3/0445* (2013.01); *G06N 7/005* (2013.01)

(58) Field of Classification Search
CPC ........ G06N 3/08; G06N 3/0445; G06N 7/005; G06F 40/45
See application file for complete search history.

(56) References Cited

U.S. PATENT DOCUMENTS 8,412,728 B1 *   4/2013   Roskind ............... G06F 16/338
                                                              707/767

FOREIGN PATENT DOCUMENTS

| CN | 103577394 A |   | 2/2014 |
|----|-------------|---|--------|
| CN | 104391820 A |   | 3/2015 |
| CN | 104391842 A |   | 3/2015 |
| CN | 106126507 A | * | 11/2016 |
| CN | 106126507 A |   | 11/2016 |

(Continued)

OTHER PUBLICATIONS

Zens et al., "Efficient Phrase-table Representation for Machine Translation with Applications to Online MT and Speech Translation",. Association for Computational Linguistics, Apr. 2007, pp. 492-499. (Year: 2007).*

(Continued)

*Primary Examiner* — Daniel T Pellett
(74) *Attorney, Agent, or Firm* — Ladas & Parry, LLP

(57) ABSTRACT

A neural network machine translation method comprises: obtaining a to-be-translated source sentence; converting the source sentence into a vector sequence; determining candidate objects corresponding to the vector sequence according to a prefix tree which is pre-obtained and built based on a target sentence database, and determining a target sentence as a translation result according to the candidate objects.

15 Claims, 4 Drawing Sheets

(56) References Cited

FOREIGN PATENT DOCUMENTS

| | | |
|---|---|---|
| CN | 106126596 A | 11/2016 |
| CN | 106202068 A | 12/2016 |

OTHER PUBLICATIONS

Devlin et al., "Fast and Robust Neural Network Joint Models for Statistical Machine Translation",. Association for Computational Linguistics, Jun. 2014, pp. 1370-1380. (Year: 2014).*

Tommasel et al., "A distributed approach for accelerating sparse matrix arithmetic operations for high-dimensional feature selection",. Springer-Verlag London, Aug. 2016, pp. 459-497. (Year: 2016).*

Karpusenko et al., "Caffe* Optimized for Intel® Architectures: Applying Modern Code Techniques",. Intel Corporation, Aug. 2016, pp. 1-9. (Year: 2016).*

Sountsov et al., "Length bias in Encoder Decoder Models and a Case for Global Conditioning",. arXiv, Sep. 2016. (Year: 2016).*

First Office Action and Search Report from CN app. No. 201710063687.7, dated Jan. 18, 2021, with English translation provided by Global Dossier.

Zens et al., "Efficient Phrase-table Representation for Machine Translation with Applications to Online MT and Speech Translation",. Association for Computational Linguistics, Apr. 2007, pp. 492-499.

Second Office Action and Search Report from CN app. No. 201710063687.7, dated Jul. 7, 2021, with English translation provided by Global Dossier.

\* cited by examiner

NEURAL NETWORK MACHINE TRANSLATION METHOD AND APPARATUS

CROSS REFERENCE TO RELATED APPLICATION

The present application claims priority to Chinese Patent Application No. 201710063687.7, filed on Feb. 3, 2017, with the title of "Neural network machine translation method and apparatus", the disclosure of which is hereby incorporated herein by reference in its entirety.

FIELD OF THE DISCLOSURE

The present disclosure relates to computer application technologies, and particularly to a neural network machine translation method and apparatus.

BACKGROUND OF THE DISCLOSURE

Recurrent neural network and its derivative networks are currently most popular deep learning network structures and are applied more and more extensively in aspects such as image recognition, speech recognition and natural language processing due to characteristics such as effective memory of historical information.

Translation is taken as an example. Neural network machine translation is a brand-new machine translation manner that arises in recent years, and can provide substantially-improved translation quality as compared with a conventional statistics translation model.

The neural network machine translation mainly comprises two procedures, namely, encoding and decoding. The encoding procedure mainly refers to convert source sentences to be translated into a vector sequence. The decoding procedure mainly refers to determine target sentences as translation results according to the vector sequence. For example, source sentences may be of one language, and target sentences may be of another language.

During the decoding procedure, when candidate objects are determined for each to-be-translated word in the vector sequence, it is necessary to respectively calculate a conditional probability for all words included in a word library. Words included by the word library are in a massive number, and the computing quantity to be performed is huge correspondingly, thereby reducing the translation speed.

SUMMARY OF THE DISCLOSURE

In view of the above, the present disclosure provides a neural network machine translation method and apparatus, which can boost the translation speed.

Specific technical solutions are as follows:

A neural network machine translation method, comprising:
obtaining a to-be-translated source sentence;
convening the source sentence into a vector sequence;
determining candidate objects corresponding to the vector sequence according to a prefix tree which is pre-obtained and built based on a target sentence database, and determining a target sentence as a translation result according to the candidate objects.

A neural network machine translation apparatus, comprising: an encoding unit and a decoding unit;
the encoding unit is configured to obtain a to-be-translated source sentence, convert the source sentence into a vector sequence, and send the vector sequence to the decoding unit;
the decoding unit is configured to determine candidate objects corresponding to the vector sequence according to a prefix tree which is pre-obtained and built based on a target sentence database, and determine a target sentence as a translation result according to the candidate objects.

It can be seen from the above introduction that according to the solution of the present embodiment, it is feasible to pre-build the prefix tree based on the target sentence database, then during translation, determine candidate objects according to the prefix tree, and thereby reduce the computing quantity and boost the translation speed as compared with the prior art.

DETAILED DESCRIPTION OF PREFERRED EMBODIMENTS

Solutions of the present disclosure will be further described in detail by describing embodiments with reference to figures to make the technical solutions of the present disclosure clearer and more apparent.

Embodiment 1

Figure 1:
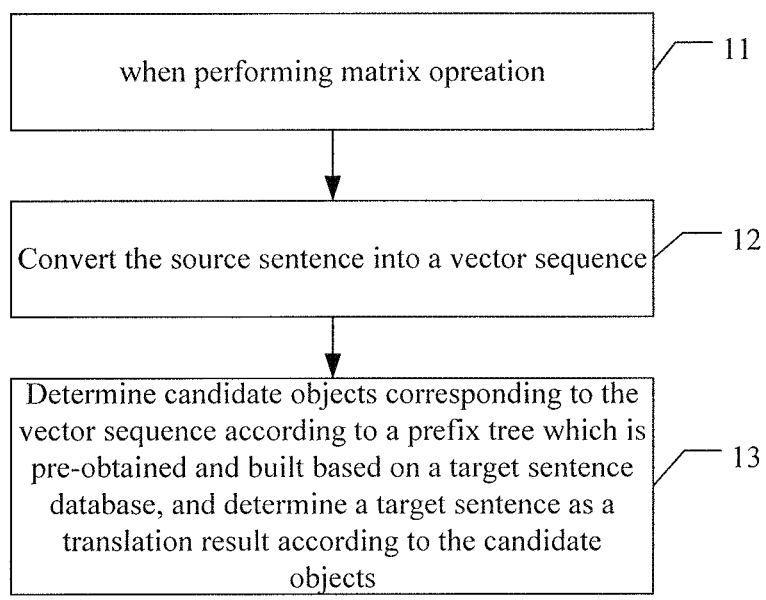
FIG. 1 is a flow chart of a neural network machine translation method according to an embodiment of the present disclosure.

FIG. 1 is a flow chart of a neural network machine translation method according to an embodiment of the present disclosure. FIG. 1 shows the following specific implementation mode.

In 11 is obtained a to-be-translated source sentence.

No limitations are imposed on how to obtain the to-be-translated source sentence.

In 12, the source sentence is converted into a vector sequence.

That is, the source sentence is encoded to obtain a desired vector sequence.

In the prior art, a Long Short Term Memory (LSTM) model is usually employed to encode the source sentence. The network structure of this model is complicated, causes the encoding speed slower and thereby reduces the translation speed.

Regarding the above problem, in the present embodiment, a Gated Recurrent Unit (GRU) model may be employed in place of the LSTM model to reduce the model complexity and improve the translation speed.

That is to say, in the present embodiment, the source sentence is converted into the vector sequence through the GRU model. How to convert is of the prior art.

In 13, candidate objects corresponding to the vector sequence are determined according to a prefix tree which is pre-obtained and built based on a target sentence database, and a target sentence as a translation result is determined according to the candidate objects.

That is, the vector sequence is decoded into the target sentence.

In practical application, first, a target sentence database is built in a manner for example manually. Specific sentences included in the target sentence database may be determined according to actual needs. Then, the prefix tree is further built based on the built target sentence database.

The prefix tree, also called a dictionary tree, is a tree-shaped structure.

Illustration is provided by way of an example.

Figure 2:
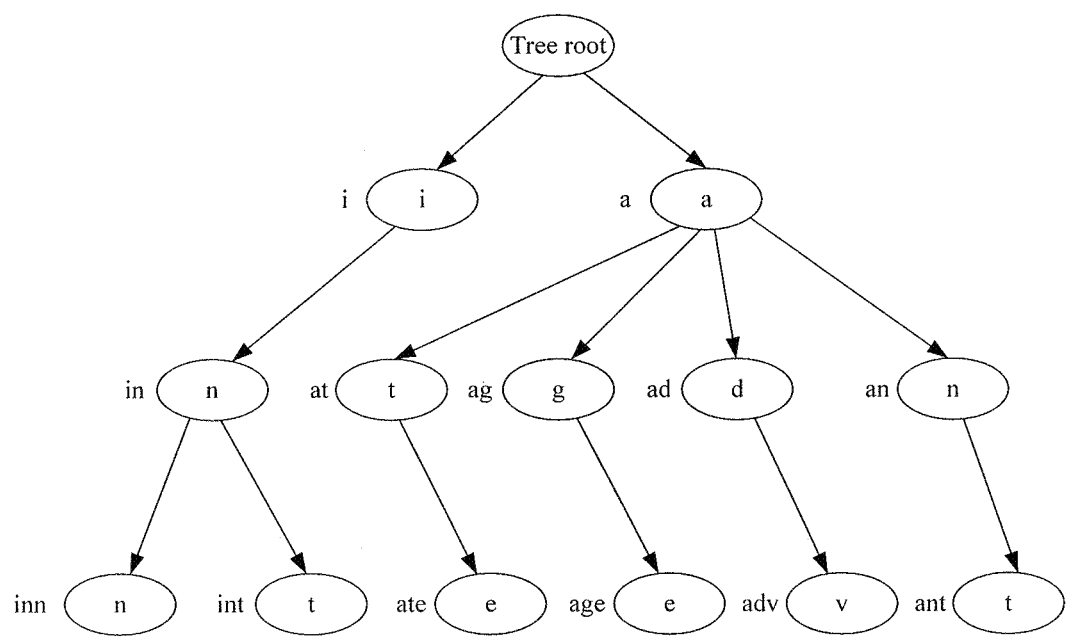
FIG. 2 is a schematic diagram of a prefix tree according to the present disclosure.

To simplify description, each letter is used to represent a word;

It is assumed that the target sentence database includes the following sentences: {inn, int, ate, age, adv, ant};

The prefix tree shown in FIG. 2 may be built according to the target sentence database, that is, FIG. 2 is a schematic diagram of the prefix tree according to the present disclosure.

As such, the following processing may be performed in turn for to-be-translated words in the vector sequence based on the built prefix tree:

respectively considering most recently-obtained candidate objects as prefixes, looking up the prefix tree for words located on next-level nodes of the prefixes, and putting the found words together with the corresponding prefixes to obtain preliminary objects;

respectively determining conditional probability of the preliminary objects, ranking the preliminary objects in a descending order of values of the conditional probability, and considering top N preliminary objects in the rank as candidate objects, N being a positive integer larger than one;

if determining there does not exist next to-be-translated word in the vector sequence, outputting top M recently-obtained candidate objects in the rank as a target sentence, M being a positive integer, M being less than or equal to N.

Especially, the following processing may be performed for the first to-be-translated word in the vector sequence because there are not candidate objects at this time:

considering all words located on the first-level nodes after a tree root in the prefix tree as preliminary objects;

respectively determining conditional probability of the preliminary objects, ranking the preliminary objects in a descending order of values of the conditional probability, and considering top N preliminary objects in the rank as candidate objects.

Figure 3:
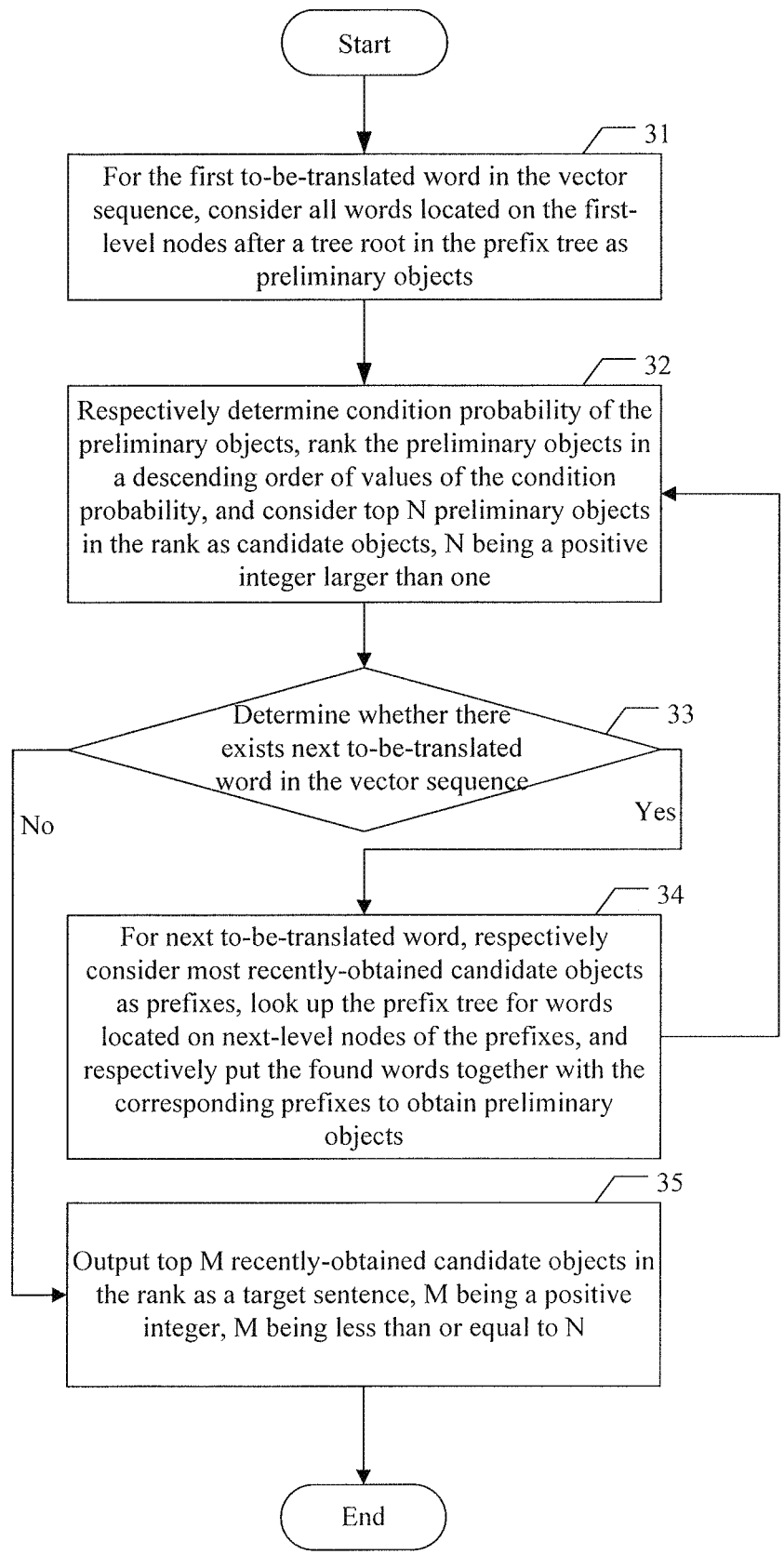
FIG. 3 is a flow chart of a decoding procedure according to the present disclosure.

To conclude the above introduction, FIG. 3 is a flow chart of the decoding procedure according to the present disclosure. FIG. 3 shows the following specific implementation mode.

In 31, for the first to-be-translated word in the vector sequence, all words located on the first-level nodes after a tree root in the prefix tree are considered as preliminary objects.

In the example shown in FIG. 2, the first-level nodes located after the tree root refer to nodes corresponding to "i" and "a".

32 relates to respectively determining conditional probability of the preliminary objects, ranking the preliminary objects in a descending order of values of the conditional probability, and considering top N preliminary objects in the rank as candidate objects, N being a positive integer larger than one.

A specific value of N may be determined according to actual needs. Which information is used to calculate the conditional probability is of the prior art.

33 relates to determining whether there exists next to-be-translated word in the vector sequence, and if yes, performing 34, or if not, performing 35.

Assume that the vector sequence includes a total of five to-be-translated words and the word that is currently processed is the fifth words, there does not exist next to-be-translated word. Correspondingly, 35 is performed subsequently, otherwise 34 is performed.

34 relates to, as for next to-be-translated word, respectively considering most recently-obtained candidate objects as prefixes, looking up the prefix tree for words located on next-level nodes of the prefixes, and putting the found words together with the corresponding prefixes to obtain preliminary objects, and then repeatedly performing 32.

In the example shown in FIG. 2, assume that the most recently-obtained candidate objects are "in" and "at", it is feasible to respectively consider them as prefixes, look up for next-level nodes, put together to obtain "inn", "int" and "ate", and consider "inn", "int" and "ate" all as preliminary objects.

In 35, top M recently-obtained candidate objects in the rank are output as a target sentence, M being a positive integer, M being less than or equal to N, and then the flow ends up.

If the processing of all to-be-translated words in the vector sequence has already been completed, top M recently-obtained candidate objects in the rank may be directly output as a desired target sentence.

A specific value of M may be determined based on actual needs. For example, M may be one or larger than one, but does not exceed N.

It can be seen from the above introduction that according to the solution of the present embodiment, it is feasible to pre-build the prefix tree based on the target sentence database, then during translation, look up and determine the preliminary objects according to the prefix tree, and calculate conditional probability of the preliminary objects to determine candidate objects. As compared with the manner of respectively calculating the conditional probability for all words included in the word library in the prior art, the solution of the present embodiment substantially reduces the computing quantity and improves the translation speed.

Furthermore, as known from the above-mentioned prefix tree-building manner and using manner, the finally-obtained target sentence is certainly a sentence in the target sentence database and thereby achieves directional translation.

In addition, in the prior art, softmax algorithm is usually employed to calculate the conditional probability of each preliminary object, so the computing complexity is high. Regarding this problem, the present embodiment proposes using self-normalization algorithm to calculate the conditional probability of each preliminary object. Specific implementation is of the prior art. In this way, the computing complexity is reduced, and the algorithm can be well matched with the decoding manner of the present disclosure to further improve the translation speed.

In addition, in 32 of the flow shown in FIG. 3, after ranking the preliminary objects in a descending order of values of the conditional probability and obtaining top N preliminary objects in the rank, it is further feasible to perform trimming processing, namely, screen said N preliminary objects to obtain preliminary objects whose conditional probability is larger than a predetermined threshold, and consider the obtained preliminary objects as candidate objects.

A specific value of the threshold may be determined according to actual needs.

Since candidate objects with too small conditional probability is very much unlikely to be retained during subsequent processing, such candidate objects may be screened away to further reduce subsequent computing quantity and further improve the translation speed.

As publicly known by those skilled in the art, the encoding and decoding procedure involves a lot of matrix operations. To further enhance the translation speed, the present embodiment proposes that a computing manner with vector decomposition and thread pool in parallel may be employed to perform matrix operation for a sparse matrix, and an Intel Math Kernel Library may be employed to perform multi-thread concurrent matrix operations for a non-sparse matrix. Specific implementation thereof is of the prior art.

In addition, in the prior art, hardware devices universally employ a central processing unit (CPU), which also limits the translation speed. In the present embodiment, the hardware devices may employ a Graphics Processing Unit (GPU) or Field Programmable Gate Array (FPGA), i.e., the method according to the present embodiment may be performed on the GPU or FPGA to further boost the translation speed.

The above introduces the method embodiment. The solution of the disclosure will be further described below through an apparatus embodiment.

Embodiment 2

Figure 4:
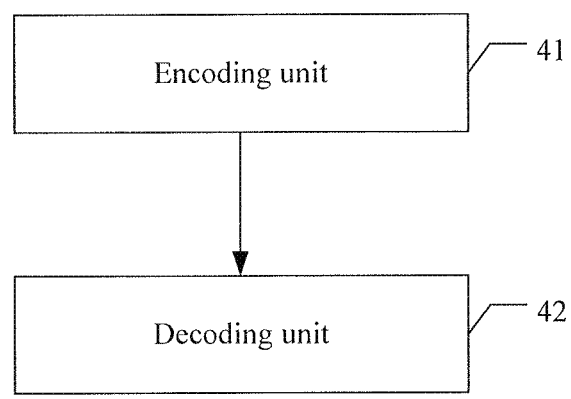
FIG. 4 is a block diagram of a neural network machine translation apparatus according to an embodiment of the present disclosure.

FIG. 4 is a block diagram of a neural network machine translation apparatus according to an embodiment of the present disclosure. As shown in FIG. 4, the apparatus comprises an encoding unit 41 and a decoding unit 42.

The encoding unit 41 is configured to obtain a to-be-translated source sentence, convert the source sentence into a vector sequence, and send the vector sequence to the decoding unit 42.

The decoding unit 42 is configured to determine candidate objects corresponding to the vector sequence according to a prefix tree which is pre-obtained and built based on a target sentence database, and determine a target sentence as a translation result according to the candidate objects.

In the prior art, a LSTM model is usually employed to encode the source sentence. The network structure of this model is complicated, causes the encoding speed slower and thereby reduces the translation speed.

Regarding the above problem, the present embodiment proposes that the encoding unit 41 may, through the GRU model, convert the source sentence into the vector sequence to reduce the model complexity and improve the translation speed.

In practical application, first, a target sentence database is built in a manner for example manually. Specific sentences included in the target sentence database may be determined according to actual needs. Then, the prefix tree is further built based on the built target sentence database.

As such, the decoding unit 42 may perform the following processing in turn for to-be-translated words in the vector sequence based on the built prefix tree:

respectively considering most recently-obtained candidate objects as prefixes, looking up the prefix tree for words located on next-level nodes of the prefixes, and putting the found words together with the corresponding prefixes to obtain preliminary objects;

respectively determining conditional probability of the preliminary objects, ranking the preliminary objects in a descending order of values of the conditional probability, and considering top N preliminary objects in the rank as candidate objects, N being a positive integer larger than one;

if determining there does not exist next to-be-translated word in the vector sequence, outputting top M recently-obtained candidate objects in the rank as a target sentence, M being a positive integer, M being less than or equal to N.

Especially, the decoding unit 42 may perform the following processing for the first to-be-translated word in the vector sequence because there are not candidate objects at this time:

for the first to-be-translated word in the vector sequence, considering all words located on the first-level nodes after a tree root in the prefix tree as preliminary objects;

respectively determining conditional probability of the preliminary objects, ranking the preliminary objects in a descending order of values of the conditional probability, and considering top N preliminary objects in the rank as candidate objects.

In addition, in the prior art, softmax algorithm is usually employed to calculate the conditional probability of each preliminary object, so the computing complexity is high and therefore affects the translation speed. Regarding this problem, the present embodiment proposes that the decoding unit 42 may use self-normalization algorithm to calculate the conditional probability of each preliminary object to reduce the computing complexity.

In addition, the decoding unit 42 is further configured to, after ranking the preliminary objects in a descending order of values of the conditional probability and obtaining top N preliminary objects in the rank, to perform trimming processing, namely, screen said N preliminary objects to obtain preliminary objects whose conditional probability is larger than a predetermined threshold, and consider the obtained preliminary objects as candidate objects.

As publicly known by those skilled in the art, the encoding and decoding procedure involves a lot of matrix operations. To further enhance the translation speed, the present embodiment proposes that a computing manner with vector decomposition and thread pool in parallel may be employed to perform matrix operation for a sparse matrix, and an Intel Math Kernel Library may be employed to perform multi-thread concurrent matrix operations for a non-sparse matrix. Likewise, the decoding unit 42 may use a computing manner with vector decomposition and thread pool in parallel to perform matrix operation for a sparse matrix, and use an Intel Math Kernel Library to perform multi-thread concurrent matrix operations for a non-sparse matrix.

Reference may be made to corresponding depictions in the above method embodiments for specific workflow of the apparatus embodiment shown in FIG. 4. Detailed depictions are not presented any more here.

To conclude, the solution of the present disclosure provides a neural network directional machine translation solution, which can substantially boost the translation speed as compared with the prior art.

In the embodiments provided by the present disclosure, it should be understood that the revealed apparatus and method can be implemented through other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, read-only memory (ROM), a random access memory (RAM), magnetic disk, or an optical disk.

What are stated above are only preferred embodiments of the present disclosure, not intended to limit the disclosure. Any modifications, equivalent replacements, improvements and the like made within the spirit and principles of the present disclosure, should all be included in the extent of protection of the present disclosure.

What is claimed is:

1. A neural network machine translation method, comprising:
   during encoding process, obtaining a to-be-translated source sentence; converting the source sentence into a vector sequence through a Gated Recurrent Unit GRU model; and
   during decoding process, determining candidate objects corresponding to the vector sequence according to a prefix tree which is pre-obtained and built based on a target sentence database, and determining a target sentence as a translation result according to the candidate objects, comprising:
   performing the following processing in turn for to-be-translated words in the vector sequence:
   respectively considering most recently-obtained candidate objects as prefixes, looking up the prefix tree for words located on next-level nodes of the prefixes, and respectively putting the found words together with the corresponding prefixes to obtain preliminary objects;
   respectively determining conditional probability of the preliminary objects, ranking the preliminary objects in a descending order of values of the conditional probability, and considering top N preliminary objects in the rank as candidate objects, N being a positive integer larger than one;
   in response to determining that there does not exist next to-be-translated word in the vector sequence, outputting top M recently-obtained candidate objects in the rank as the target sentence, M being a positive integer, M being less than or equal to N.

2. The method according to claim 1, wherein
   the method further comprises:
   for the first to-be-translated word in the vector sequence, considering all words located on the first-level nodes after a tree root in the prefix tree as preliminary objects;
   respectively determining conditional probability of the preliminary objects, ranking the preliminary objects in a descending order of values of the conditional probability, and considering top N preliminary objects in the rank as candidate objects.

3. The method according to claim 1, wherein
   the method further comprises:
   for top N preliminary objects after the ranking, screening said N preliminary objects to obtain preliminary objects whose conditional probability is larger than a predetermined threshold, and considering the obtained preliminary objects as candidate objects.

4. The method according to claim 1, wherein
   the respectively determining conditional probability of the preliminary objects comprises:
   using a self-normalization algorithm to respectively determine the conditional probability of all preliminary objects.

5. The method according to claim 1, wherein
   during execution of the method, when performing matrix operations, using a computing manner with vector decomposition and thread pool in parallel to perform matrix operations for a sparse matrix, and performing multi-thread concurrent matrix operations for a non-sparse matrix.

6. A device, wherein the device comprises:
   one or more processors;
   a memory;
   one or more programs stored in the memory and configured to execute the following operation when executed by the one or more processors:
   during encoding process, obtaining a to-be-translated source sentence; converting the source sentence into a vector sequence through a Gated Recurrent Unit GRU model; and
   during decoding process, determining candidate objects corresponding to the vector sequence according to a prefix tree which is pre-obtained and built based on a target sentence database, and determining a target sentence as a translation result according to the candidate objects, comprising:
   performing the following processing in turn for to-be-translated words in the vector sequence:
   respectively considering most recently-obtained candidate objects as prefixes, looking up the prefix tree for words located on next-level nodes of the prefixes, and respectively putting the found words together with the corresponding prefixes to obtain preliminary objects;
   respectively determining conditional probability of the preliminary objects, ranking the preliminary objects in a descending order of values of the conditional probability, and considering top N preliminary objects in the rank as candidate objects, N being a positive integer larger than one;
   in response to determining that there does not exist next to-be-translated word in the vector sequence, outputting top M recently-obtained candidate objects in the rank as the target sentence, M being a positive integer, M being less than or equal to N.

7. The device according to claim 6, wherein
   the operation further comprises:
   for the first to-be-translated word in the vector sequence, considering all words located on the first-level nodes after a tree root in the prefix tree as preliminary objects;
   respectively determining conditional probability of the preliminary objects, ranking the preliminary objects in a descending order of values of the conditional probability, and considering top N preliminary objects in the rank as candidate objects.

8. The device according to claim 6, wherein
   the operation further comprises:
   for top N preliminary objects after the ranking, screening said N preliminary objects to obtain preliminary objects whose conditional probability is larger than a predetermined threshold, and considering the obtained preliminary objects as candidate objects.

9. The device according to claim 6, wherein
the respectively determining conditional probability of the preliminary objects comprises:
using a self-normalization algorithm to respectively determine the conditional probability of all preliminary objects.

10. The device according to claim 6, wherein
during execution of the method, when performing matrix operations, using a computing manner with vector decomposition and thread pool in parallel to perform matrix operations for a sparse matrix, and performing multi-thread concurrent matrix operations for a non-sparse matrix.

11. A non-transitory computer storage medium in which one or more programs are stored, an apparatus being enabled to execute the following operation when said one or more programs are executed by the apparatus:
during encoding process, obtaining a to-be-translated source sentence; converting the source sentence into a vector sequence through a Gated Recurrent Unit GRU model; and
during decoding process, determining candidate objects corresponding to the vector sequence according to a prefix tree which is pre-obtained and built based on a target sentence database, and determining a target sentence as a translation result according to the candidate objects, comprising:
performing the following processing in turn for to-be-translated words in the vector sequence:
respectively considering most recently-obtained candidate objects as prefixes, looking up the prefix tree for words located on next-level nodes of the prefixes, and respectively putting the found words together with the corresponding prefixes to obtain preliminary objects;
respectively determining conditional probability of the preliminary objects, ranking the preliminary objects in a descending order of values of the conditional probability, and considering top N preliminary objects in the rank as candidate objects, N being a positive integer larger than one;
in response to determining that there does not exist next to-be-translated word in the vector sequence, outputting top M recently-obtained candidate objects in the rank as the target sentence, M being a positive integer, M being less than or equal to N.

12. The non-transitory computer storage medium according to claim 11, wherein
the operation further comprises:
for the first to-be-translated word in the vector sequence, considering all words located on the first-level nodes after a tree root in the prefix tree as preliminary objects;
respectively determining conditional probability of the preliminary objects, ranking the preliminary objects in a descending order of values of the conditional probability, and considering top N preliminary objects in the rank as candidate objects.

13. The non-transitory computer storage medium according to claim 11, wherein
the operation further comprises:
for top N preliminary objects after the ranking, screening said N preliminary objects to obtain preliminary objects whose conditional probability is larger than a predetermined threshold, and considering the obtained preliminary objects as candidate objects.

14. The non-transitory computer storage medium according to claim 11, wherein
the respectively determining conditional probability of the preliminary objects comprises:
using a self-normalization algorithm to respectively determine the conditional probability of all preliminary objects.

15. The non-transitory computer storage medium according to claim 11, wherein
during execution of the method, when performing matrix operations, using a computing manner with vector decomposition and thread pool in parallel to perform matrix operations for a sparse matrix, and performing multi-thread concurrent matrix operations for a non-sparse matrix.

* * * * *